March 31, 1931.     R. R. SEARLES     1,798,907
ANTIFRICTION SPRING BEARING
Filed March 31, 1925
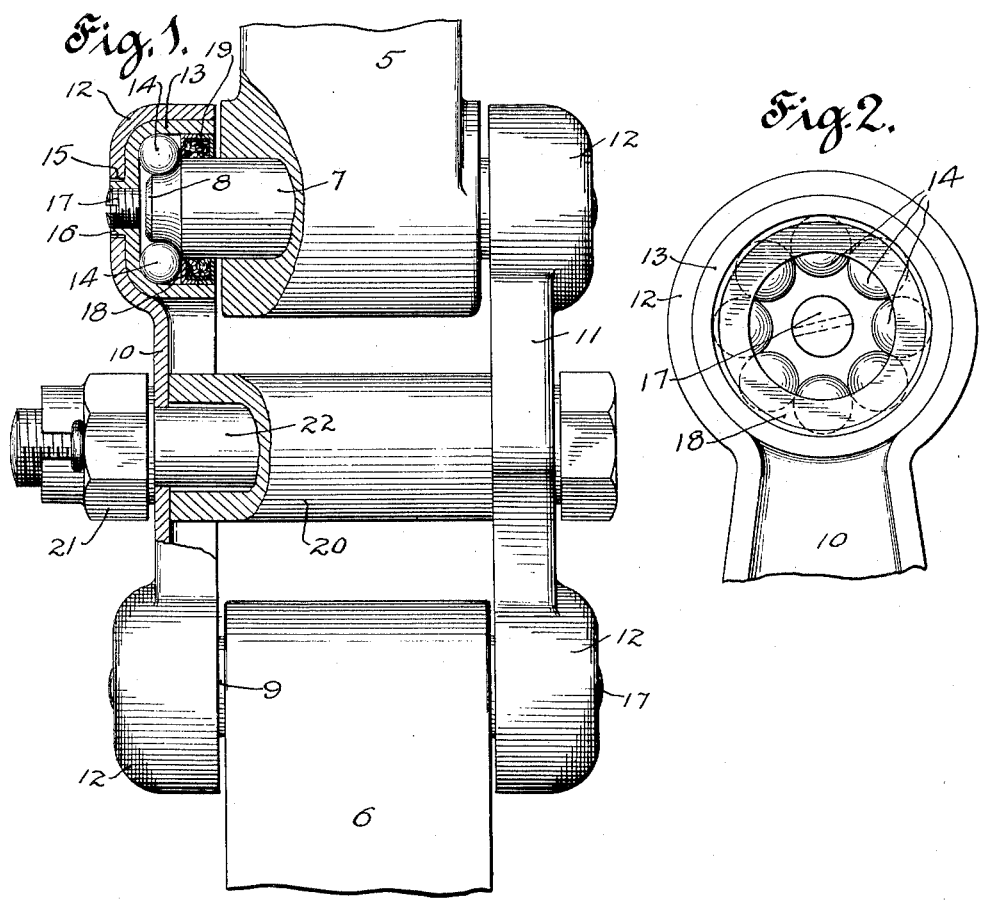
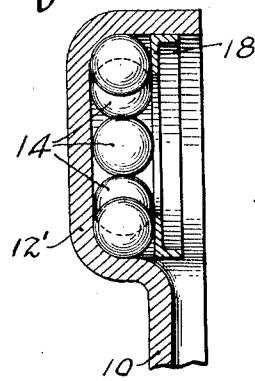
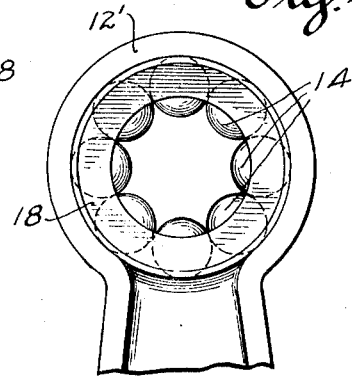
Inventor
Raymond R. Searles
By his Attorneys
Mitchell Bechert Patented Mar. 31, 1931

1,798,907

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

ANTIFRICTION SPRING BEARING

Application filed March 31, 1925. Serial No. 19,564.

My invention relates to an anti-friction spring bearing, and particularly to a spring shackle.

It is an object of the invention to provide an anti-friction spring bearing in which the anti-friction bearing members may be held in place independently of the shackle bearing pins, whereby the shackle cheek plates and assembled anti-friction bearing members may be handled as a unit.

It is a more specific object to provide a shackle cheek plate with an anti-friction raceway on which there are a plurality of anti-friction bearing members so arranged as to hold each other in place against inward radial dislodgment.

It is a further object to provide a shackle cheek plate having an anti-friction bearing member raceway therein with means to permit the introduction of a tool for forcing the raceway out of the cheek plate.

It is a further object to provide an anti-friction shackle with a raceway member and means for permitting access to the anti-friction bearing members in order to lubricate the same.

It is a more general object to provide a spring bearing or connection in which anti-friction bearing members are unitarily carried by one of the connecting members so that they may be handled therewith as a unit.

Other objects will appear as the specification proceeds.

Briefly stated, in the preferred form of the invention the shackle includes two shackle cheek plates carrying anti-friction bearing members. Bearing pins are secured to a vehicle frame and spring, and the ends project therefrom and engage, either directly or through an inner ring, with the anti-friction bearing members. The shackle plates are suitably held together and may be spaced apart by a spacer member if desired. The anti-friction bearing members are held in the raceways against both radial and axial displacement, so that the shackle cheek plates may be handled as a unit with the bearing members in place and the latter will not drop out when the shackle cheek plates are removed from the bearing pins. This desirable result may be accomplished by filling the raceway substantially full of anti-friction bearing members whereby the same form in effect keystone arches, so as to prevent inward radial movement of the bearing members, and some additional means, such as a washer or dust ring, may be provided for preventing axial displacement. If desired, the raceways for the anti-friction bearing members may be formed directly in the shackle cheek plates or in separate race rings or cups carried by the shackle cheek plates. In the latter case it is desirable to have the auxiliary race ring or cup seated in a suitable recess or cup in the shackle cheek plate, and in order to render easy the removal of this auxiliary cup I prefer to form an aperture in the shackle to permit the introduction of a tool to drive out the auxiliary cup. This aperture likewise affords communication with the space about the anti-friction bearing members through a suitable aperture in the inside cup or race ring.

In the drawings which show, for illustrative purposes only, preferred forms of the invention—

Fig. 1 is a fragmentary end view in partial section of a vehicle frame and spring held together by a shackle, illustrating features of the invention;

Fig. 2 is an enlarged inside view of one end of a shackle cheek plate and illustrating features of the invention;

Fig. 3 is a central sectional view of Fig. 4;

Fig. 4 is a view similar to Fig. 2 but illustrating a modified form.

In the drawings, 5 indicates a portion of a vehicle frame to be connected to the spring 6. 7 indicates a bearing pin preferably shrunk or otherwise rigidly secured in the frame 5 and having oppositely projecting ends, as 8. 9 indicates a bearing pin suitably held in the end of the spring 6 and, since it may be a substantial duplicate of the pin 7, no separate detailed illustration thereof has been made. 10—11 indicate shackle cheek plates which, if desired, may be formed of sheet metal and may have seats or recesses 12—12 at opposite ends thereof, that is to say, at spaced apart points on the link. In the form illustrated in Figs. 1 and 2 I employ a separate anti-friction member raceway, which may be in the form of a sheet metal cup 13 fitting tightly in each of the seats 12—12. The cups 13 are formed at the bottom so as to provide suitable bearing races for anti-friction bearing members, such as balls 14—14. Each shackle plate, if desired, may be apertured, as indicated at 15, whereby the cup 13 may be forced outwardly by a suitable tool if occasion arises to remove the cup from the cheek plate for the purpose of renewal or repair. In the form shown, the cup 13 has a projecting lug or boss 16, which may extend into the aperture 15 so as to come substantially flush with the outer surface thereof and form substantially a continuation thereof. The lug 16 may be centrally apertured to permit access to the space about the balls 14—14, to permit the introduction of lubricant into the cup 13. A screw plug 17 may serve to close the aperture in the boss 16.

It is desirable to have the balls or other anti-friction bearing members 14 held in place independently of the bearing pins, such as 7 and 9 so that the cheek plates and assembled anti-friction bearing members may be handled as units. With that end in view I prefer to substantially fill the bearing cups 13—13 with anti-friction members, such as the balls 14—14. Such a completely filled cup is clearly shown in Fig. 2. With the balls substantially completely filling the bearing cup, the points of contact between adjacent balls will be radially inwardly of the circle passing through the centers of all of the balls, and it will therefore be plain that each ball, in effect, acts as the keystone of an arch formed by the two adjacent balls, and therefore all of the balls will serve to prevent any of the balls from inward radial displacement. Of course, other means could be employed for holding the balls against dropping out radially, but the method just described is very satisfactory and provides for the maximum number of balls and affords a good bearing surface for the bearing on the pins.

Some form of washer 18 or ring may be frictionally or otherwise securely held in the end of the cup 13 and abut or come up quite closely to the balls, whereby the latter are held against outward axial displacement. If desired, the washer 18 may form a part of a suitable dust ring 19 fitting over the ends of the pins 7 and 9, for excluding dust from the balls and bearing surfaces.

Now it will be plain that by the simple means disclosed the balls are held against dropping out either radially or axially when the shackle plates are removed from the pins and the cheek plates with the balls assembled may be stored, shipped or handled as a unit. The assembling of a shackle embodying this feature is greatly facilitated. Obviously the cups 13 and assembled balls 14—14 may be handled and sold as units separately from the shackle plates.

The pins 7—9 suitably support the frame through the balls, and in the form shown I have not illlustrated what may be termed an inner bearing ring, but have formed a bearing seat 20 directly upon the ends of the pins 7 and 9. This construction has been found to be satisfactory in use and cheap to manufacture.

In the form shown in Figs. 3 and 4 the balls or other anti-friction members 14—14 are mounted directly in the seats or cups as 12' without the interposition of a separate bearing ring or cup, such as 13, shown in Figs. 1 and 2. In Figs. 3 and 4 the washer 18, as in the previous case, serves to hold the balls against outward axial movement, while the balls themselves as previously described resist inward radial displacement. Here also the washer 18 may form part of a dust ring, as in the previous example.

The construction and operation of the form shown in Figs. 3 and 4 is substantially the same as that shown in Figs. 1 and 2, except that the balls are mounted directly on seats in the shackle plates. In the particular form shown, no aperture has been shown for permitting the introduction of lubricant though obviously such aperture might be provided.

The balls and pins may serve to space the plates 10—11 apart but I prefer to employ a spacer 20 between the same to prevent undue pressure on the balls when the nut 21 on the securing bolt 22 is drawn up.

While the invention has been described in detail as embodied in a spring connection in the form of a shackle, I do not wish to be limited to that form of connection nor to the specific forms shown, since such forms are but illustrative, and changes may be made within the scope of the invention as defined in the appended claims.

I claim:

1. In a shackle for securing a vehicle frame and spring to each other, a pair of shackle cheek plates having seats for anti-friction members at opposite ends thereof, anti-friction bearing members arranged on said seats so as to substantially completely fill the same whereby the anti-friction members will be arranged to form arches to prevent radial inward movement of said anti-friction bearing members, means to be carried by a spring and frame and having anti-friction raceways thereon to engage said anti-friction bearing members, and means assembled with said seats for preventing axial displacement of said anti-friction bearing members when said raceways carried by said spring and frame are withdrawn.

2. In a shackle; a pair of shackle cheek plates having seats at opposite ends thereof, bearing balls arranged in said seats so as to substantially completely fill the latter whereby the balls will form arches so as to prevent the same from inward radial movement, supporting means to be carried by a spring and frame and engaging said balls, and means for preventing axial movement of said balls when said supporting means be disengaged from said balls.

3. In a shackle, a pair of shackle cheek plates having seats at opposite ends thereof, anti-friction bearing members on said seats, bearing pins arranged between said cheek plates for cooperation with said anti-friction bearing members, said anti-friction bearing members being held against inward radial displacement independently of said bearing pins, and means for preventing axial displacement of said anti-friction bearing members, whereby the anti-friction bearing members are held in place on said seats when the bearing pins are removed.

4. In a shackle, a pair of shackle cheek plates having seats at opposite ends thereof, raceway members on said seats, anti-friction bearing members in said raceway members, bearing pins to engage said anti-friction bearing members, said anti-friction members being held against inward radial displacement independently of said pins, and means for preventing outward axial displacement of said anti-friction bearings when said pins are withdrawn.

5. In a shackle, a pair of shackle cheek plates having seat recesses at opposite ends thereof, anti-friction bearing member raceways seated in said recesses and carrying anti-friction bearing members, said cheek plates having openings therein to permit access to said bearing raceways, said raceways having openings registering with said openings in said shackle cheek plates whereby lubricant may be introduced onto said anti-friction bearing members from said registering openings.

6. In the combination defined in claim 5, said raceways being in the form of cups, and plugs for closing the apertures in said raceway cups.

7. In a shackle, a pair of shackle cheek plates having seats at opposite ends thereof and openings in the bottom of said seats, bearing cups mounted in said seats and carrying anti-friction members, said cups having lugs thereon extending into the openings in the bottom of said seats.

8. In the combination defined in claim 7, said lugs having openings therein for permitting access to the interior of said cups.

9. A shackle link, and antifriction bearing members permanently carried by said link at opposite ends thereof, whereby said link and assembled antifriction bearing members may be handled and applied as a unit.

10. A shackle link having seats at opposite ends thereof, bearing raceways permanently carried by said seats, and antifriction bearing members permanently held on said seats, whereby said link, bearing raceways, and antifriction bearing members may be handled and applied as a unit.

11. A shackle link having a bearing raceway at each end thereof, antifriction bearing members carried by said raceways on said link, and means for securing said bearing members on said raceways, whereby said link and assembled bearing members may be assembled with complementary raceways and disassembled without danger of separation of said bearing members from said link.

12. A shackle link having seat recesses at opposite ends thereof, cup-shaped bearing races seated on said seats, said seat recesses having openings in the bottoms thereof extending over the bottoms of said cup-shaped bearing races, whereby a tool may engage said bearing races directly through said openings for driving said races from said seat recesses.

13. In a shackle construction, a pair of shackle links having seats at opposite ends thereof, antifriction bearing members for coaction with said seats, means to be carried by a spring and frame and having seats for coaction with said antifriction bearing members, said antifriction bearing members being unitarily assembled with some of said seats whereby said shackle links may be separated and said antifriction bearing members remain unitarily assembled with said some of said seats for the purpose described.

14. In a spring connection, a shackle link having seats for anti-friction bearing members at opposite ends thereof, said seats being formed directly on said link, and antifriction bearing members unitarily assembled with said seats whereby said link and assembled anti-friction bearing members may be handled and applied as a unit.

15. In a spring connection, a shackle link having seats for anti-friction bearing members at opposite ends thereof, said seats being formed directly on said link, anti-friction bearing members on said seats, and sheet metal plate means carried by said link and extending over said anti-friction bearing members to assist in unitarily assembling said anti-friction bearing members with said link whereby said link and anti-friction bearing members may be handled and applied as a unit.

16. In a spring connection, means to be carried by a spring and having raceways for anti-friction bearing members thereon, side members to be supported from a frame and having raceways for anti-friction bearing members complementary to said first-mentioned raceways, anti-friction bearing members interposed between said complementary raceways, said anti-friction bearing members being unitarily assembled with said side members whereby said side members together with assembled anti-friction bearing members may be handled and applied as units.

17. In a spring connection for connecting a spring part to a frame part, means carried by one of said parts and having raceways for anti-friction bearing members, means to be carried by the other of said parts and having raceways complementary to said first mentioned raceways, anti-friction bearing members interposed between said complementary raceways, said anti-friction bearing members being unitarily assembled with the raceways of one of said means.

18. In a spring connection for connecting a spring part to a frame part, means carried by one of said parts and having raceways for anti-friction bearing members, means to be pivotally carried by the other of said parts and having raceways complementary to said first mentioned raceways, anti-friction bearing members interposed between said complementary raceways, said anti-friction bearing members being unitarily assembled with the raceways of one of said means.

19. In a spring connection for connecting a spring part to a frame part, a pair of side members supported from one of said parts and having raceways for anti-friction bearing members, anti-friction bearing members on said raceways and unitarily assembled therewith whereby said side members and unitarily assembled anti-friction bearing members may be handled as units, and the other of said parts extending between said side members and embodying means having raceways complementary to said first mentioned raceways to engage said anti-friction bearing members.

20. In a spring connection, a pair of side members having cup recesses therein for anti-friction bearing members, anti-friction bearing members in said cup recesses and unitarily assembled with said side members whereby said side members and anti-friction bearing members may be handled as units, said side members having openings therein eccentric to said cup recesses to receive means for holding said side members in position, and means having raceways to engage said anti-friction bearing members.

RAYMOND R. SEARLES.